(12) United States Patent
Beasley et al.

(10) Patent No.: US 7,188,957 B2
(45) Date of Patent: Mar. 13, 2007

(54) PROJECTION SYSTEMS AND METHODS FOR BOTH COLOR AND MONOCHROMATIC DISPLAYS

(75) Inventors: Matthew Beasley, Dallas, OR (US); James R. Cole, Albany, OR (US); David Meados, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 202 days.

(21) Appl. No.: 10/969,310

(22) Filed: Oct. 20, 2004

(65) Prior Publication Data

US 2006/0082734 A1    Apr. 20, 2006

(51) Int. Cl.
*G03B 21/14* (2006.01)
*G02B 5/22* (2006.01)

(52) U.S. Cl. .................... 353/84; 353/31; 348/743; 359/891

(58) Field of Classification Search .............. 353/84, 353/33, 31, 122; 348/742, 743; 359/885, 359/887, 889–892
See application file for complete search history.

(56) References Cited

U.S. PATENT DOCUMENTS

| | | | |
|---|---|---|---|
| 5,233,385 A | 8/1993 | Sampsell | |
| 5,650,832 A * | 7/1997 | Poradish et al. | 348/743 |
| 6,054,832 A | 4/2000 | Kunzman et al. | |
| 6,256,425 B1 * | 7/2001 | Kunzman | 382/274 |
| 6,715,887 B2 | 4/2004 | Chang | |
| 6,729,734 B2 | 5/2004 | Childers et al. | |
| 6,754,014 B1 | 6/2004 | Chin et al. | |
| 6,756,976 B2 | 6/2004 | Richards | |
| 6,796,661 B2 | 9/2004 | Hirobe | |
| 6,796,689 B2 | 9/2004 | Dho | |
| 6,874,892 B1 * | 4/2005 | McDaniel | 353/84 |
| 6,876,505 B2 * | 4/2005 | Niwa | 359/891 |
| 7,052,146 B2 * | 5/2006 | Esterberg et al. | 353/119 |

* cited by examiner

*Primary Examiner*—W. B. Perkey
*Assistant Examiner*—Andrew Sever

(57) ABSTRACT

A projection system for both color and monochromatic displays includes a color wheel having filter portions of different colors and a clear portion; and a drive system configured to keep the color wheel moving while keeping a projection light beam shining through the clear portion of the color wheel.

40 Claims, 3 Drawing Sheets

PROJECTION SYSTEMS AND METHODS FOR BOTH COLOR AND MONOCHROMATIC DISPLAYS

BACKGROUND

Video projection systems are widely used in a variety of applications. For example, video projection systems, both forward and rear projection systems, are widely used in "big screen" home entertainment systems to provide a much larger picture that is economically available using a conventional cathode ray tube. Additionally, video projection systems may be used in a theater to display a movie or other video program, or still pictures for a relatively large audience. Video projection systems are also used in business, education, training and other areas to display presentations such as, pictures, graphs, charts, outlines, etc., for a number of people to view. In another example, video projection can make it possible for a relatively large number of people to observe a computer desktop and the work being done by an operator of the computer. Because video projection systems are so widely used, there is a constant desire to improve on known video projection systems.

Video projection systems typically make use of a very powerful lamp or light source to provide sufficient light to project an image or video program onto a screen or other display surface. Projected video or pictures may be full color or monochromatic, e.g. black and white.

The brighter the light from the projection system, the clearer and easier to see the projected image may be. However, because the light used in a projection system is so intense, it is necessary to address issues, such as excess heat, caused by the lamp. The light from the projection lamp is hot enough to potentially cause damage to components of the projection system.

SUMMARY

A projection system for both color and monochromatic displays includes a color wheel having filter portions of different colors and a clear portion, and a drive system configured to keep the color wheel moving while keeping a projection light beam shining through the clear portion of the color wheel.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes a video projection system that can be used to project either full color or monochromatic (e.g., black and white) video or still pictures, i.e., a color or monochromatic display. The lumens efficiency or light intensity of the projection system is increased for monochromatic projection by placing a clear portion of a color wheel in the projection light beam. Damage to the clear portion of the color wheel is avoided by keeping the color wheel in motion so that the clear portion rotates back and forth to oscillate or "dither" in the projection light beam without moving a colored or filter portion of the color wheel into the projection light beam.

Figure 1:
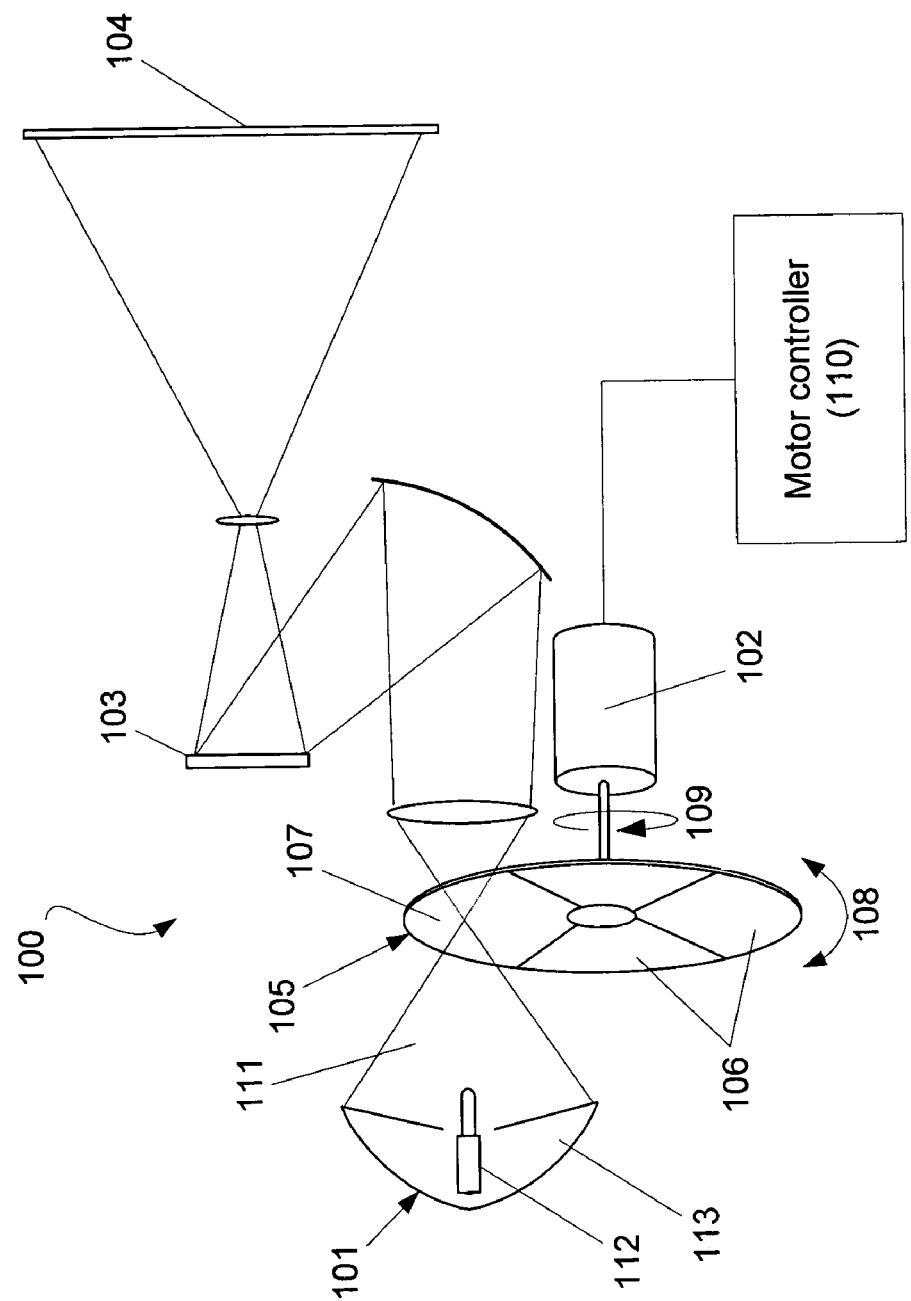
FIG. 1 is an illustration of a video projection system according to principles described herein.

FIG. 1 is an illustration of a video projection system according to principles described herein. As shown in FIG. 1, an exemplary video projection system (100) includes a projection light source (101). This light source (101), as illustrated in FIG. 1, may include a high-intensity lamp (112), such as an ultra high pressure (UHP) mercury lamp, surrounded by a reflector (113).

Light generated by the lamp (112) is white, meaning that it contains a variety of wavelengths or colors across the visible spectrum. The light of the lamp (112) is concentrated as a "fireball" located at a focal point of the reflector (113). The reflector (113) then collects and focuses the light from the lamp (112) into a projection light beam (111).

The projection light beam (111) is then directed by the projection optics to a spatial light modulator (SLM) (103). The SLM (103) may be, for example, a Digital Micro-mirror Device™ (DMD) or a Liquid Crystal Display (LCD) panel. The SLM (103) is driven by a video signal and creates an image that is then projected by the projection system (100) using the projection light beam (111). The image formed on the SLM (103) and projected using the light beam (111) may be motion picture video or still pictures.

The projection light beam (111), bearing the image from the SLM (103), is then projected onto a screen or other projection surface (104) where the projected image is visible to the human eye. The projection surface (104) may be, for example, a rear or forward projection screen, a white panel or wall or some other projection surface. The projection system (100) may be incorporated into a projector unit, projection television or other projection system.

The projection system (100) also includes a color wheel (105). The color wheel (105) is typically a disk or substrate made of glass. Different sections (106) of the wheel (105) are coated to form different color filters. For example, the color wheel (105) may be coated to form Red, Green and Blue color filters disposed sequentially around the wheel (105). A fourth portion (107) of the wheel is clear and does not color filter the projection light beam (111). The projection light beam (111) shines through the color wheel (105) before being directed by the projection optics to the SLM (103).

For a full color display, the color wheel (105) is rotated rapidly, as shown by arrow (109), in the path of the projection light beam (111). A motor (102) is used to rotate the color wheel (105). As the color wheel (105) is rotated, the Red, Blue and Green filter portions (106) of the wheel (105) are brought sequentially into the projection light beam (111). Thus, the combination of the light source (101) and the color wheel (105) outputs, in sequence, red, blue and green projection light beams.

The SLM (103) is driven so that a red component of the image to be projected is formed when red light is being output, i.e., the red filter portion of the color wheel (105) is in the projection light beam (111); a blue component of the image to be projected is formed when blue light is being output, i.e., the blue filter portion of the color wheel (105) is in the projection light beam (111); and a green component of the image to be projected is formed when green light is being output, i.e., the green filter portion of the color wheel (105) is in the projection light beam (111).

Even though the red, blue and green components of the image are created and projected sequentially, corresponding to the rotation of the color wheel (105), the color components of the image arrive at the projection surface (104) rapidly enough that the human eye simply perceives a full color image. In this way, the white light of the lamp (112) can be used with the color wheel (105) to project full color video or images on the projection surface (104).

In the projection system (100), the lumens efficiency or light intensity of the projection light beam (111) is reduced due to the insertion of the color filter portions (106) of the color wheel (105) into the path of the beam (111). Consequently, the projection light beam (111) suffers a loss and is less intense for each individual color after being filtered by the color wheel (105).

It is desirable for the light beam (111) to be very intense or bright, with high lumens efficiency, when projecting an image. The brighter the light beam (111), the easier and clearer the projected image may be for a viewer to see.

Consequently, when the image being projected is monochromatic, e.g., black and white, it is desirable to avoid a lumens efficiency loss due to the color filters (106) or the color wheel (105). For this reason, the color wheel (105) includes the clear portion (107) that does not lower the intensity of the projection light beam (111). This clear portion (107) may be clear glass, e.g., a portion of the glass disk of the color wheel (105) with no coating or filter formed thereon.

For the projection of a monochromatic image (motion picture video or still), the clear portion (107) of the color wheel (105) is brought into the projection light beam (111) by rotation of the color wheel (105) by the motor (102). The projection light beam (111) then shines through the clear portion (107) of the color wheel (105) with little or no significant loss of intensity across the visible spectrum.

The unfiltered light beam (111) is then directed to the SLM (103) by the projection optics and used to project a monochromatic image on the projection surface (104). Thus, the projection system (100) can be used to project both full color and monochromatic images, with maximized lumens output for the monochromatic display.

However, if the color wheel (105) is stopped with the clear portion (107) in the projection light beam (111), the color wheel (105) becomes subject to damage from high thermal stress caused by the very intense projection light beam (111). During full color operation, when the color wheel (105) is kept in constant rotation to output sequential red, blue and green projection beams, the thermal stress caused by the projection light beam (111) is spread out over the wheel (105). Consequently, any significant damage is avoided or minimized.

But, if the color wheel (105) remains stationary, the projection light beam (111) is focused and concentrated on a relatively small section of the wheel (105), i.e., the clear portion (107). The resulting thermal stress may cause, for example, cracking of the glass substrate of the wheel (105) due to temperature gradients created across the wheel (105).

Also, because glass is thermally conductive, the thermal stress will heat the entire disk of the color wheel (105). As a result, the coatings on the wheel (105), e.g., the color filter coatings, may be burned.

To avoid such damage, the color wheel (105) could be removed from the path of the projection light beam (111) during projection of monochromatic images. However, that would require additional and precise mechanical parts to selectively remove and accurately reinsert the color wheel (105) into the optical axis of the projection system.

As described in the present specification, a safe monochromatic display can be provided by rotating the clear portion (107) of the color wheel (105) into the projection light beam (111) and then oscillating the color wheel (105) back and forth, clockwise and counterclockwise, (i.e., dithering) as shown by arrow (108). This motion of the wheel (105) is performed without rotating a color filter portion (106) of the wheel (105) into the projection light beam (111). Thus, the color wheel (105) remains in motion, but keeps only the clear portion (107) of the wheel (105) in the path of the light projection beam (111).

In this way, the thermal stress caused by the projection light beam (111) is spread out over the clear portion (107) of the color wheel (105). This prevents or reduces the damage that may be caused by concentrating the projection light beam (111) on a stationary color wheel (105).

A motor controller (110) is provided and configured to drive the motor (102) for either full-color or monochromatic display. The motor controller (110) can drive the motor (102) to rotate the color wheel (105) at a constant velocity for full color projection or oscillate the color wheel (105) with the clear portion (107) in the projection light beam (111) for monochromatic projection with increased luminosity.

Figure 2:
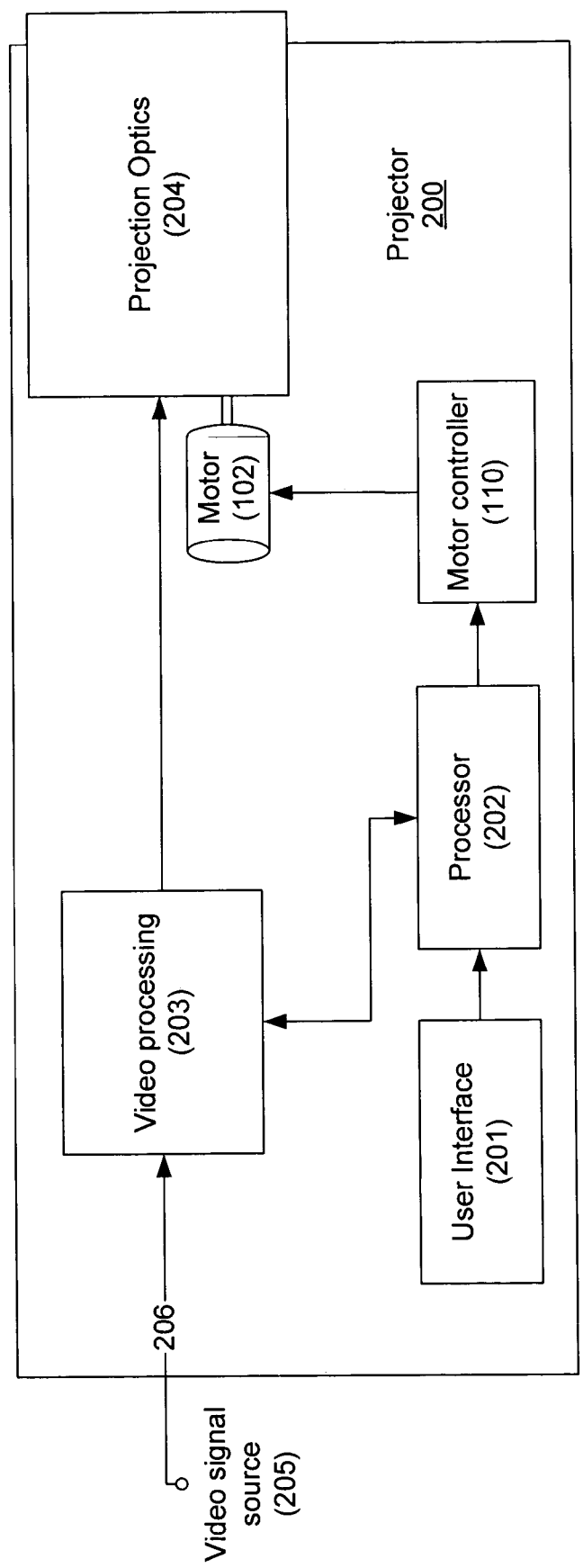
FIG. 2 is a block diagram of a video projector incorporating the video projection system of FIG. 1.

FIG. 2 is a block diagram of a video projector incorporating the video projection system of FIG. 1. As shown in FIG. 2, the projector (200) includes the motor (102), motor controller (110) and projection optics illustrated in FIG. 1. The projection optics block (204) in FIG. 2 includes the light source, color wheel, SLM and other projection optics illustrated and/or described in connection with FIG. 1.

The projector of FIG. 2 may be a stand alone projector or may be incorporated into a larger system such as a television set or other entertainment system. The projector (200) may be mounted to a wall, ceiling, table or configured as a portable unit.

As shown in FIG. 2, the projector (200) receives a video signal (206) from a video signal source (205). The video signal source (205) can be any device or system for outputting a video signal bearing motion or still pictures for projection and display by the projector (200). The video signal source (205) may include, for example, a computer, a laptop, a set-top box, a digital versatile disc (DVD) player, a video cassette recorder (VCR), a camcorder, a satellite or terrestrial antenna, a cable television system, etc. The video signal (206) is processed through a video processing block (203) and then used to drive the SLM of the projection optics (204).

A processor (202) of the projector (200) may be in communication with the video processing circuitry (203). In this way, the processor (202) may determine whether the incoming video signal is a full color video signal or a monochromatic video signal. If the incoming video signal (206) is full color, the processor (202) may automatically control the motor controller (110) to drive the motor (102) to rotate the color wheel of the projection optics (204) at a constant velocity to provide full color projection, as described above.

Alternatively, if the incoming video signal is a monochromatic video signal, the processor (202) may automatically control the motor controller (110) to drive the motor (102) to oscillate the clear portion of the color wheel of the projection optics (204) in the projection light beam, as described above. This allows an advantageous increase in the lumens output of the projector (200) while in monochromatic mode, without allowing damage to the color wheel.

A user interface (201) may also be provided on the projector (200). The user interface (201) may include any devices for allowing a user to provide input to, or control, the projector (200). For example, the user interface (201) may include buttons, a keypad, switches, dials, knobs, sliders, a display device, a touch-sensitive display device, etc.

The user of the projector (200) may operate the user interface (201) to control whether the projector (200) operates in a full color or monochromatic mode. Input from the user interface (201) is transmitted to the processor (202).

In this way, the processor (202) may determine whether the user desires a full color or a monochromatic display. If the user selects full color, the processor (202) will control the motor controller (110) to drive the motor (102) to rotate the color wheel of the projection optics (204) at a constant velocity to provide full color projection, as described above.

Alternatively, if the user selects a monochromatic display, the processor (202) will control the motor controller (110) to drive the motor (102) to oscillate the clear portion of the color wheel of the projection optics (204) in the projection light beam, as described above. Again, this allows an advantageous increase in the lumens output of the projector (200) while in monochromatic mode, without causing damage to the color wheel.

Figure 3:
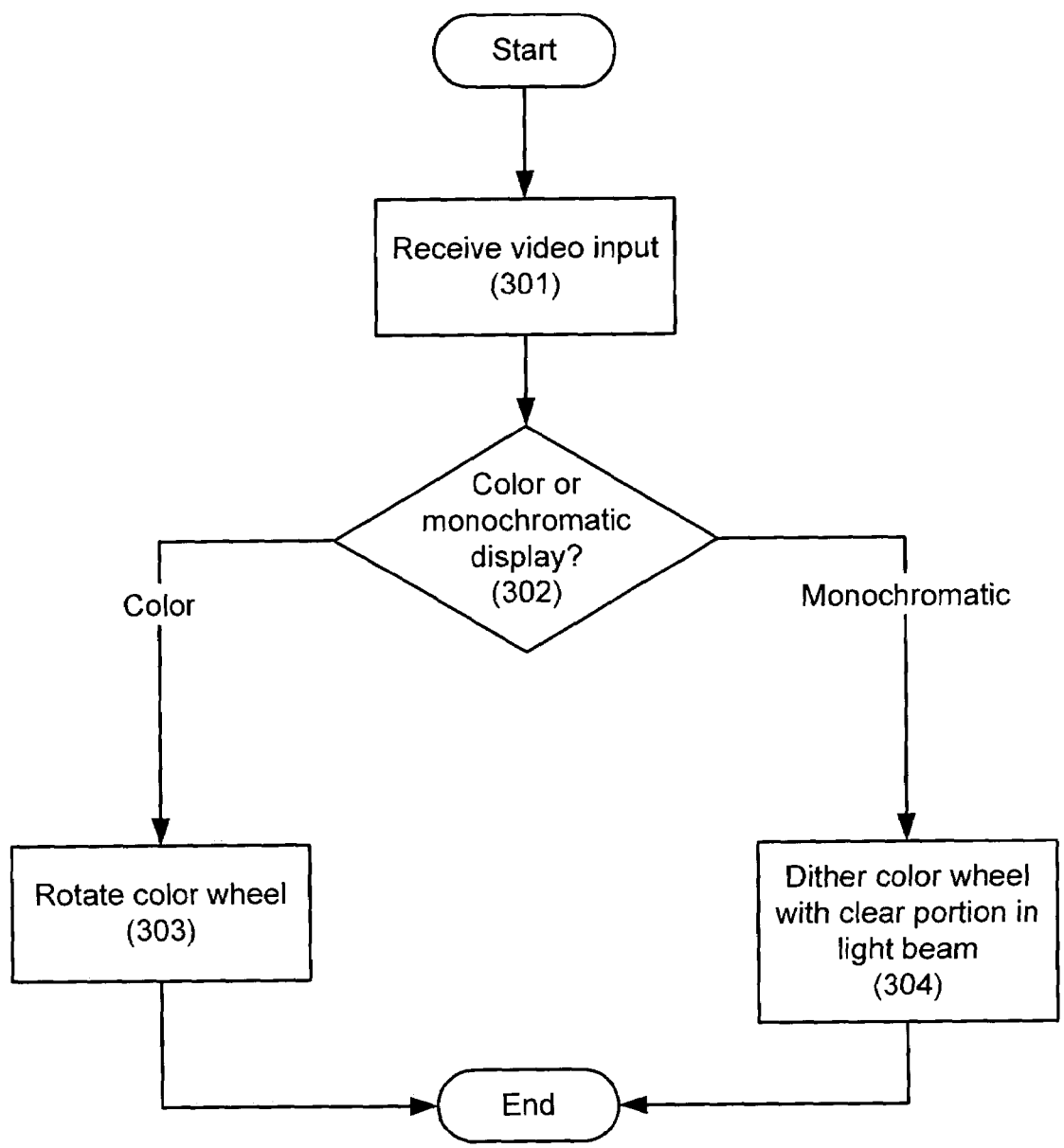
FIG. 3 is a flowchart illustrating a method of operating a video projection system according to principles described herein.

FIG. 3 is a flowchart illustrating a method of operating a video projection system according to principles described herein. As shown in FIG. 3, video input is received (step 301) by the projection system.

Next, it is determined whether a full color or monochromatic display is to be output (determination 302). This determination (302) may be made automatically based on the video signal being received or may be based on user input.

If a full color display is selected, the color wheel of the projection system is rotated at constant velocity (step 303), as described above, to produce sequential red, blue and green components of the projected image. The result appears to be a projected full color image to the human eye.

If a monochromatic display is selected, the color wheel of the projection system is oscillated or dithered, back and forth, clockwise and counterclockwise (step 304) with only a clear portion of the color wheel being kept in the projection light beam of the system. As described above, this allows an advantageous increase in the lumens output of the projection system while in monochromatic mode, without causing damage to the color wheel.

In other embodiments, the processor (202), motor controller (110) and/or motor (102) may be configured to oscillate so as to keep a colored filter (106) portion of the color wheel (105) in the projection light beam (111). In some applications, it may be desirable to have a continuous projection beam in a single color. Consequently, dithering or oscillating the color wheel to keep the corresponding color filter (106) in the projection light beam will allow the projector to produce such a monochromatic projection beam while avoiding any damage to the color wheel (105).

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A projection system for both color and monochromatic displays comprising:
    a color wheel comprising filter portions of different colors and a clear portion, wherein each of said portions, including said clear portion, are arranged to extend from a center to a periphery of said wheel and are arranged in sequence around a circumference of said wheel; and
    a drive system configured to keep said color wheel moving with an oscillating rotation that keeps a projection light beam shining through only said clear portion of said color wheel when said projection system is operating in a monochromatic mode.

2. The system of claim 1, wherein said drive system comprises a motor driven by a motor controller.

3. The system of claim 1, wherein said drive system is also configured to rotate said color wheel to sequentially bring each of said filter portions into said projection light beam in a color display mode.

4. The system of claim 1, further comprising a lamp and reflector for outputting said projection light beam to said color wheel.

5. The system of claim 1, wherein said color wheel comprises a glass substrate and said filter portions comprise coated portions of said substrate.

6. The system of claim 1, further comprising a user interface for controlling said projection system.

7. The system of claim 6, wherein said user interface is configured to allow a user to select a color display mode or a monochromatic display mode.

8. The system of claim 7, wherein if said monochromatic display mode is selected, said drive system is configured to keep said color wheel in motion while keeping a projection light beam shining through said clear portion of said color wheel.

9. The system of claim 7, wherein if said color display mode is selected, said drive system is configured to rotate said color wheel to sequentially bring each of said filter portions into said projection light beam in a color display mode.

10. The system of claim 1, further comprising a spatial light modulator for forming an image to be projected using said projection light beam.

11. The system of claim 10, further comprising:
    an input for a video signal; and
    a video processing circuit configured to process a video signal from said input and drive said spatial light modulator for forming an image to be projected.

12. The system of claim 10, further comprising projection optics for projecting said projection light beam bearing said image from said spatial light modulator to a projection surface.

13. A method of operating a projection system for both color and monochromatic displays, said method comprising, when operating to produce a monochromatic display, keeping a color wheel in motion while keeping a projection light beam shining through only a clear portion of said color wheel, wherein said color wheel is rotated with periodic changes in rotational direction in order to keep said projection light shining though only a clear portion of said color wheel, said motion reducing thermal stress on said color wheel.

14. The method of claim 13, wherein keeping said color wheel in motion is performed with a drive system comprising a motor driven by a motor controller.

15. The method of claim 13, further comprising a color display mode in which said method comprises rotating said color wheel to sequentially bring each of a plurality of differently-colored filter portions of said color wheel into said projection light beam.

16. The method of claim 13, further comprising controlling said projection system with a user interface.

17. The method of claim 16, wherein said user interface is configured to allow a user to select a color display mode or a monochromatic display mode.

18. The method of claim 17, further comprising:
selecting said monochromatic display mode; and
in response to selection of said monochromatic display mode, oscillating said color wheel while keeping a projection light beam shining through said clear portion of said color wheel.

19. The method of claim 17, further comprising:
selecting said color display mode; and
in response to selection of said color display mode, rotating said color wheel to sequentially bring each of a plurality of differently-color filter portions into said projection light beam.

20. The method of claim 13, further comprising:
modulating said light beam with an image formed on a spatial light modulator; and
projecting said light beam bearing said image to a projection surface.

21. A projection system for both color and monochromatic displays comprising:
a color wheel comprising filter portions of different colors and a clear portion; and
means far oscillating a rotational direction of said color wheel so as to keep said color wheel in motion during display of a monochromatic image and so as to keep a projection light beam shining through said clear portion of said color wheel without rotating a said filter portion into said projection light beam in a monochromatic display mode.

22. The system of claim 21, wherein said means for oscillating comprise a motor driven by a motor controller.

23. The system of claim 21, further comprising means for rotating said color wheel to sequentially bring each of said filter portions into said projection light beam in a color display mode.

24. The system of claim 21, further comprising a lamp and reflector for outputting said projection light beam to said color wheel.

25. The system of claim 21, wherein said color wheel comprises a glass substrate and said filter portions comprise coated portions of said substrate.

26. The system of claim 21, further comprising means for a user to control said projection system.

27. The system of claim 26, wherein said means for a user to control said projection system comprise means for selecting a color display mode or a monochromatic display mode.

28. The system of claim 27 wherein if said monochromatic display mode is selected, said means for oscillating said color wheel are activated.

29. The system of claim 27 wherein if said color display mode is selected, means for rotating said color wheel are activated to sequentially bring each of said filter portions into said projection light beam in a color display mode.

30. The system of claim 21, further comprising means for forming an image to be projected using said projection light beam.

31. The system of claim 30, further comprising:
an input for a video signal; and
video processing means for processing a video signal from said input.

32. The system of claim 30, further comprising projection means for projecting said projection light beam bearing said image to a projection surface.

33. A projector for projecting both color and monochromatic displays comprising:
a color wheel comprising a plurality of filter portions of different colors and a clear portion, wherein each of said portions, including said clear portion, are arranged to extend from a center to a periphery of said wheel and are arranged in sequence around a circumference of said wheel; and
a drive system for said color wheel;
wherein said drive system is configured to:
selectively operate in a monochromatic display mode by oscillating a rotational direction of said color wheel to keep said color wheel moving during display of a monochromatic image while keeping a projection light beam shining through said clear portion of said color wheel; and
selectively operate in a color display mode by rotating said color wheel to sequentially bring each of said filter portions into said projection light beam.

34. The projector of claim 33, wherein said drive system comprises a motor driven by a motor controller.

35. The projector of claim 33, wherein said color wheel comprises a glass substrate and said filter portions comprise coated portions of said substrate.

36. The projector of claim 33, further comprising a user interface for selecting said monochromatic display mode or said color display mode.

37. A projection system for both color and monochromatic displays comprising:
a color wheel comprising filter portions of different colors and a clear portion, wherein each of said portions, including said clear portion, are arranged to extend from a center to a periphery of said wheel and are arranged in sequence around a circumference of said wheel; and
a drive system configured to keep said color wheel moving with an oscillating rotation that keeps a projection light beam shining through said clear portion or a particular one of said filter portions of said color wheel.

38. The system of claim 37, wherein said drive system oscillates a rotational direction of said color wheel to keep said color wheel in motion with said clear or filter portion in said projection light beam without rotating a different portion of said color wheel into said projection light beam.

39. The system of claim 37, wherein said drive system is also configured to rotate said color wheel to sequentially bring each of said filter portions into said projection light beam in a color display mode.

40. A method of operating a projection system for both color and monochromatic displays, said method comprising oscillating a rotational direction of a color wheel during display of an image so as to keep a projection light beam shining through only a clear portion or a particular color filter portion of said color wheel, said motion reducing thermal stress on said color wheel.

* * * * *